United States Patent [19]
Charlton

[11] 3,878,146
[45] Apr. 15, 1975

[54] CURED EPOXY RESIN COMPOSITIONS USEFUL IN THE PROTECTION OF ELECTRICAL CABLES

[75] Inventor: John R. Charlton, Agincourt, Ontario, Canada

[73] Assignee: Hexcel Corporation, Dublin, Calif.

[22] Filed: June 4, 1973

[21] Appl. No.: 367,041

[52] U.S. Cl............ 260/18 PN; 174/68; 260/18 EP; 260/30.6 R; 260/31.8 E; 260/33.4 EP; 260/830 P
[51] Int. Cl............................................. C08g 30/14
[58] Field of Search ...... 260/18 EP, 30.6 R, 31.8 E, 260/33.4 EP, 18 PN

[56] References Cited
UNITED STATES PATENTS

| | | | |
|---|---|---|---|
| 2,848,426 | 8/1958 | Newey | 260/18 |
| 2,911,316 | 11/1959 | Rinse | 260/18 |
| 2,921,040 | 1/1960 | May | 260/18 |
| 3,170,887 | 2/1965 | Ramos | 260/31.8 |
| 3,314,912 | 4/1967 | Bean, Jr. et al | 260/30.6 |
| 3,477,966 | 11/1969 | Doss | 260/31.8 |

*Primary Examiner*—Donald E. Czaja
*Assistant Examiner*—Eugene C. Rzucidlo

[57] ABSTRACT

A composition designed for pumping into flooded electrical cables to displace water. It contains a liquid epoxy resin having a viscosity of about 1.2–250 poises (ASTM D445), and an epoxide equivalent of about 150–198 (ASTM A16552) and an amine type hardener. An oxidized vegetable oil is incorporated to maintain substantially permanent flexibility in the composition after curing. A phthalate or phosphate ester provides reduced initial viscosity to permit pumping of the composition into the cables. A cyclic alcohol such as cyclohexanol provides a non-separating condition and particularly prevents bleed-out of the plasticizer.

10 Claims, No Drawings

3,878,146

CURED EPOXY RESIN COMPOSITIONS USEFUL IN THE PROTECTION OF ELECTRICAL CABLES

This invention relates to the maintenance of underground electrical cables. More particularly, it relates to the treatment of flooded electrical cables to displace the water and reclaim the cable for normal use.

In the communications industry many cables are buried underground. It is important for electrical reasons that these cables be kept free of water. Water increases the capitance of the cables and causes interference between the circuits carried in the individual wires within the cable. Inevitably with the passage of time the sheathing of the cable either corrodes or is pierced mechanically so that water fills or floods the interior of the cable.

Until recently there has been no practical technique for repairing such flooded cables and they previously were simply replaced when flooding occurred. More recently, a new procedure has been developed to reclaim and place the flooded cables back into service. This new technique comprises pumping a polymerizable resinous composition before curing and while fluid into an end of the cable. The resinous mass flows through the cable displacing the water before it. When the process has been completed, a cable is optimally obtained in which the individual wires within the cable that form the communication circuits are individually surrounded by the resin which has polymerized in place after having displaced the water.

A suitable polymerizable resinous composition for use in the foregoing technique should meet the following requirements to be commercially acceptable.

1. The composition should have flexibility and low mechanical strength. Flexibility is required so that the cable can move during expansion and contraction induced by temperature changes. Low mechanical strength is required so that a repairman can separate the individual wires to make repairs if needed. Before it becomes polymerized and cured, and thereafter in the hardened condition when in place, the formulation must not adversely affect the insulation of the conductor wires in the cable.

2. The unpolymerized composition should have a sufficiently low viscosity so that it can be pumped easily through long cables. It is also preferable that the resinous composition have good wetting characteristics towards polyethylene and polypropylene, the typical insulation found on the conductor wires in the cable. Of course, the composition should have electrical properties which do not interfere with the normal operation of the cable wires.

3. The composition should also have a suitably long pot life, considering the circumstances and location of cables in the field and the conditions under which the composition is applied. For practical purposes the composition should have a pot life of about 24–48 hours.

At the present time the most successful product that has been employed in displacing water from flooded cables to reclaim the same, is a composition including an isocyanate resin, a petroleum oil, and a polyether or polyester. The composition solidifies upon introduction into a cable to form a jelly-like solid polyurethane plastic. The formulation has a number of unsuitable characteristics. Some of the principal unsuitable aspects of the composition are that the unpolymerized material is toxic and reacts with water to form a foam. The petroleum oils diffuse into the insulation and change the electrical characteristics of the cable. The polymerization time is too short.

The present invention provides a novel composition which meets all of the requirements discussed above while avoiding all of the undesirable characteristics in the previously used isocyanate-based formulation. In accordance with the present invention, a composition for displacing water in flooded electrical cables is provided which comprises a liquid epoxy resin of viscosity between about 1.2–250 poises (ASTM D445), and an epoxide equivalent of about 150-198 (ASTM A 16552); an amine hardener for said epoxy resin in an amount sufficient to cure the same; an oxidized vegetable oil; a phthalate or phosphate ester plasticizer; and a cyclic alcohol; said vegetable oil, ester, and alcohol being selected and admixed in amounts to provide substantially permanent flexibility and non-separation to the composition together with an initially pumpable viscosity.

The foregoing composition is uniquely suited for displacement of water in flooded electrical cables by virtue of having the requisite degree of flexibility after being hardened or cured when in place within the cable. Normally, such a degree of flexibility is not obtainable with a conventional epoxy-amine hardener system. The addition of plasticizer alone to a conventional epoxy system would not provide a satisfactory formulation since almost all plasticizers eventually bleed out of the resin if they are used in the amount necessary to provide sufficient flexibility. These problems are overcome in the composition of this invention through the use of oxidized vegetable oils. By proper selection of such materials, a compatibility with the liquid epoxy resin-amine hardener system in amounts sufficient to produce the required flexibility and low viscosity is obtained. The use of oxidized vegetable oils as distinguished from the raw or unoxidized form of the oils is critical to such compatability and the successful practice of this invention.

Vegetable oils such as linseed oil vary in viscosity in approximate correlation to the amount of oxidation they have undergone, the higher the viscosity, the greater oxidation. The state of oxidation is generally measured by the iodine number, the lower the number, the higher the state of oxidation. It has been found that linseed oil with a viscosity of E on the Gardiner Scale and an iodine number of 110-150 is compatible and will not bleed in all ratios with a liquid epoxy-amine system of the type defined above. In general, the vegetable oil selected should have an iodine value of less than about 170 in order to form a compatible formulation with the resin hardener system although compatibility may not exist in all ratios. Low viscosity unoxidized oils such as raw linseed oil having iodine values greater than 170 exhibit immediate or incompatibility after relatively short periods. Thus after a few days such a raw linseed oil will separate out and the remaining solidified resin will crack.

While a highly oxidized vegetable oil provides the desired compatibility, unfortunately the oxidation process increases the viscosity of the vegetable oil. Thus while the highly oxidized oils are compatible with the epoxy resin, the resulting composition viscosity is not entirely satisfactory due to difficulties in pumping stemming from the high viscosity. The present invention succeeds in permitting the use of the highly oxidized vegetable oils by reducing overall composition viscosity through the addition of low viscosity plasticizers. To this end, sufficient phthalate or phosphate ester plasticizers are selected and added in amounts to produce an overall composition viscosity suitable for pumping.

Unfortunately, here again the addition of the plasticizer introduces one more problem. The plasticizer tends to separate out from the composition. Again this problem is overcome through the incorporation of a cyclic alcohol which has been found to reduce or entirely eliminate the tendency of the plasticizer to separate out with the passage of time. Thus, the addition of the oxidized vegetable oil produces substantially permanent flexibility while the phthalate or phosphate plasticizer provides a low viscosity suitable for pumping. The alcohol tends to homogenize all of the components and particularly prevents the plasticizer from prematurely separating. The end composition is non-toxic, is not reactive with or sensitive to water, and has adequate working and electrical properties. The oxidized vegetable oil also provides the advantage of delaying gelation of the epoxy resin for a sufficient time to provide a convenient working time for using the formulation in the field.

The basic resin component in the formulation is a conventional liquid epoxy resin of a viscosity between about 1.2–250 poises and an epoxide equivalent of about 150–198, preferably 1.6–160 poises. A typical commercial liquid epoxy resin meeting these requirements is Shell Epon 826. The formulation includes an amine or amide-type hardener which will generally be added in stoichiometric proportion to the amount of epoxy resin employed.

Any of the usual phthalate or phosphate ester plasticizers are contemplated including dibutyl phthalate, butyl benzyl phthalate, triphenyl phosphate and the like. The ester plasticizer will usually be present in the composition in an amount of about 10 phr to 200 phr of epoxy resin. The cyclic alcohol such as cyclohexanol will generally be added in an equal amount to the plasticizer. Other examples of effective cyclic alcohols include benzyl alcohol and phenyl ethyl alcohol.

The following examples will illustrate the invention more specifically. The epoxy resin utilized is Shell Epon 826. The amine hardener utilized is the commercially available material Duomeen O, which is an aliphatic amine derived from linseed oil. As will be seen in the examples, other amines and polyamides and combinations thereof may be used as hardeners as is known in the art.

| EXAMPLE I | |
|---|---|
| Epoxy resin | 50 pbw |
| Oxidized Linseed Oil | 160 pbw |
| Dibutyl Phthalate | 40 pbw |
| Cyclohexanol | 40 pbw |
| Triethylene Tetramine | 5 pbw |
| Triethanolamine | 1 pbw |
| Duomeen O | 35 pbw |

The initial viscosity of this mixture was 150–200 cp. at 80° F. and gelation time was 48 hours at 70° F. The product was soft-rubbery and transparent. Upon aging at 150° F. for 7 days, it showed no evidence of plasticizer migration.

| EXAMPLE II | |
|---|---|
| Epoxy resin | 50 pbw |
| Raw Linseed Oil | 160 pbw |
| Dibutyl Phthalate | 40 pbw |
| Cyclohexanol | 40 pbw |
| Triethylene Tetramine | 5 pbw |
| Triethanolamine | 1 pbw |
| Duomeen O | 35 pbw |

Initially the composition was similar to Example I but within a few days of aging the raw linseed oil separated out and the cured resin was subject to cracking.

EXAMPLE III

The same formulation as in Example I was used, but oxidized soybean oil of iodine value of 75 was incorporated instead of oxidized linseed oil. The results were essentially the same as Example I.

EXAMPLE IV

The formulation of Example II was followed except that raw soybean oil was substituted for raw linseed oil. The results were substantially the same as in Example II.

EXAMPLE V

The formula of Example I was followed except that a reactive polyamide commercially available from General Mills under the name of Versamid 140 was substituted for Duomeen O. Versamid polyamide resins are long chain linear polymers derived from the reaction of dimerized linoleic acid with di- or polyamines. The results were essentially similar except that because the viscosity of Versamid is higher than Duomeen the final formulation was of higher viscosity. Also the range of compatibility of the various oils was lower.

In all of the above formulations triethanolamine was added to promote mixing and wetting of the wire insulation found within the cables. Otherwise it has no significant effect on the other properties of the formulation.

In a comparison between raw castor oil and oxidized castor oil utilizing the above formulation, results were observed to be substantially the same as with linseed oil although the range of compatibility was less. Also, oxidized oiticica oil has been found to behave substantially the same as oxidized linseed oil.

One preferred composition would utilize 100–200 phr of oxidized linseed oil having a number of about 110–150 for each 100 parts of the epoxy resin. Other useful typical formulations are as follows:

a) Epoxy Resin of viscosity 1.6–160 poises and epoxide equivalent of 150–198 — 100 parts

| | |
|---|---|
| Oxidized Linseed Oil | 150–200 phr |
| Dibutyl or dioctyl Phthalate | 25–75 phr |
| Cyclohexanol | 25–75 phr |
| Triethylene Tetramine | 3–7 phr |
| Duomeen O (Linseed Oil Diamine) | 30–35 phr |
| Triethanolamine | 1–3 phr | b) Epoxy Resin — 100 parts

| | |
|---|---|
| Cyclohexanol | 30–35 phr |
| Dioctylphthalate | 30–35 phr |
| Oxidized Linseed Oil | 125 phr |
| Linseed or Soybean Oil Amine | 35 phr | c) Epoxy Resin — 100 parts

| | |
|---|---|
| Cyclohexanol | 30–35 phr |
| Phthalate Ester | 30–40 phr |
| Oxidized Linseed Oil | 125 phr |

-Continued

```
Polymeric Amine e.g. Versamid 140              100 phr
d) Epoxy Resin — 100 parts
   Cyclohexanol                                30-35 phr
   Phthalate Ester                             30-35 phr
   Oxidized Soybean Oil                        125 phr
   Linseed or Soy Oil Amine                    35 phr
e) Epoxy Resin — 100 parts
   Cyclohexanol                                30-35 phr
   Phthalate Ester                             30-35 phr
   Oxidized Soybean Oil                        125 phr
   Polyamine e.g. Versamid 140                 50 phr
f) Epoxy Resin — 100 parts
   Cyclohexanol                                30-35 phr
   Phthalate Ester                             30-35 phr
   Oxidized Linseed Oil                        125 phr
   Triethylene Tetramine                       4-6 phr
```

What is claimed is:

1. A cured flexible epoxy resin composition useful in the protection of electrical cables subject to flooding comprising:
   an amine cured epoxy resin derived from an epoxy resin having a viscosity between about 1.2–250 poises (ASTM D445) and an epoxide equivalent of about 150–198 (ASTM A16552), wherein said amine is linseed oil diamine or a long chain, amine terminated polyamide resin obtained by the treatment of dimerized linoleic acid with a polyamine;
   an oxidized vegetable oil having an iodine value of less than about 170;
   a phthalate plasticizer for said epoxy resin in from 10–200 phr based on said epoxy resin; and
   from 10–200 phr of cyclohexanol, benzyl alcohol or phenyl ethyl alcohol.

2. A composition in accordance with claim 1 wherein said epoxy resin has a viscosity of about 1.6–160 poises.

3. A composition in accordance with claim 1 wherein said oxidized vegetable oil is oxidized linseed oil.

4. A composition in accordance with claim 1 wherein said oxidized vegetable oil is oxidized oiticica oil.

5. A composition in accordance with claim 1 wherein said oxidized vegetable oil is oxidized castor oil.

6. A composition in accordance with claim 1 wherein said vegetable oil is oxidized soybean oil.

7. A composition in accordance with claim 1 wherein cyclic alcohol is cyclohexanol.

8. A composition in accordance with claim 1 wherein said composition includes, in relative amounts, 100 parts of liquid epoxy resin of viscosity 1.6–160 poises, 100–200 phr of oxidized linseed oil having an iodine number of about 110–150, and said ester plasticizer is a phthalate ester present in an amount of about 25–75 phr.

9. A composition in accordance with claim 8 wherein said cyclic alcohol is cyclohexanol, and said phthalate ester and alcohol each comprise about 30–35 phr.

10. A composition in accordance with claim 9 wherein said oxidized linseed oil comprises about 125 phr.

* * * * *